United States Patent
Quach et al.

(10) Patent No.: US 7,430,605 B2
(45) Date of Patent: Sep. 30, 2008

(54) METHOD OF PRINTER ACCOUNTING MANAGEMENT

(75) Inventors: Tony Quach, Anaheim, CA (US); Truc D. Nguyen, San Diego, CA (US)

(73) Assignee: Toshiba Tec Kabushiki Kaisha (JP)

( * ) Notice: Subject to any disclaimer, the term of this patent is extended or adjusted under 35 U.S.C. 154(b) by 669 days.

(21) Appl. No.: 09/970,133

(22) Filed: Oct. 3, 2001

(65) Prior Publication Data
US 2003/0065713 A1 Apr. 3, 2003

(51) Int. Cl.
*G06F 15/173* (2006.01)
*G06F 3/12* (2006.01)

(52) U.S. Cl. .................. 709/229; 358/1.13

(58) Field of Classification Search .......... 709/203, 709/225, 229; 705/34; 358/1.15, 1.13, 1.14; 726/4
See application file for complete search history.

(56) References Cited

U.S. PATENT DOCUMENTS

| | | | |
|---|---|---|---|
| 5,014,088 A | | 5/1991 | Wakikaido et al. |
| 5,383,129 A | * | 1/1995 | Farrell ..................... 705/400 |
| 5,619,649 A | * | 4/1997 | Kovnat et al. ............. 358/1.15 |
| 5,673,190 A | * | 9/1997 | Kahleck et al. ................ 700/2 |
| 5,709,377 A | | 1/1998 | Yoshioka et al. |
| 5,903,801 A | * | 5/1999 | Nakamura .................. 399/79 |
| 5,970,218 A | * | 10/1999 | Mullin et al. ............. 358/1.15 |
| 6,006,045 A | * | 12/1999 | Miyawaki ..................... 399/8 |
| 6,025,925 A | * | 2/2000 | Davidson et al. .......... 358/1.15 |
| 6,026,380 A | | 2/2000 | Weiler et al. |
| 6,064,836 A | * | 5/2000 | Nakamura et al. ............. 399/8 |
| 6,115,132 A | * | 9/2000 | Nakatsuma et al. ........ 358/1.14 |
| 6,122,463 A | * | 9/2000 | Nagatani ..................... 399/80 |
| 6,161,185 A | * | 12/2000 | Guthrie et al. ................. 726/5 |
| 6,181,893 B1 | * | 1/2001 | Collard et al. ................ 399/80 |
| 6,216,113 B1 | * | 4/2001 | Aikens et al. ................. 705/34 |
| 6,247,135 B1 | | 6/2001 | Feague |
| 6,424,424 B1 | * | 7/2002 | Lomas et al. ............. 358/1.14 |
| 6,453,127 B2 | * | 9/2002 | Wood et al. .................... 399/8 |
| 6,484,934 B2 | * | 11/2002 | Salgado ..................... 235/375 |
| 6,535,297 B1 | * | 3/2003 | Steele et al. ............... 358/1.15 |
| 6,618,566 B2 | * | 9/2003 | Kujirai et al. ................ 399/79 |
| 6,641,312 B1 | * | 11/2003 | Chang et al. .................. 400/76 |
| 6,944,777 B1 | * | 9/2005 | Belani et al. ................... 707/9 |
| 7,231,661 B1 | * | 6/2007 | Villavicencio et al. ......... 726/4 |
| 2001/0021976 A1 | * | 9/2001 | Shibuya et al. .............. 713/169 |
| 2003/0014368 A1 | * | 1/2003 | Leurig et al. ................. 705/64 |
| 2005/0073709 A1 | * | 4/2005 | Kujirai et al. ............. 358/1.14 |
| 2006/0221373 A1 | * | 10/2006 | Parrish et al. ............. 358/1.13 |

* cited by examiner

*Primary Examiner*—Andrew Caldwell
*Assistant Examiner*—Benjamin Ailes
(74) *Attorney, Agent, or Firm*—Tucker Ellis & West LLP

(57) ABSTRACT

A method is disclosed in which a print dialog is invoked to select printing options for a document. A department code is entered on the print dialog, and a print command is submitted while concurrently sending the department code for validation. A validation step is performed to determine whether the department code is valid. A print job is generated if the entered department code is valid. If the department code is invalid, the user is prompted to enter a valid department code.

10 Claims, 2 Drawing Sheets

METHOD OF PRINTER ACCOUNTING MANAGEMENT

BACKGROUND OF THE INVENTION

The present invention is directed to the field of print function management. The invention has particular applicability for departmental accounting of printer resources as used with a network or other configuration where one or more printers are shared between multiple computer users.

Shared network printer configurations are common in many offices and other commercial establishments. It has become popular to incorporate a combined printer and photocopier in a single unit. Such devices include a printer controller, which includes an onboard processor and memory for managing the print function. The print controller receives print commands from the print driver onboard the user's personal computer and accordingly queues print jobs for printing over the combined unit.

In order increase efficiency by reducing uncharged photocopying, many offices have implemented an accounting system whereby a departmental or other type account code must be entered into the photocopier prior to enabling the copy function. The copier retains a set of codes, which can be department codes or other type access codes. These codes can be maintained on-board the copier in memory or can be accessed through the network. In order to enforce the code at the copier level, it must be enabled by entering a valid department code for every copy job before the copy "start" key is enabled. Upon entry of a valid code, the copier function is enabled. Thus, validation is performed prior to enabling the copy request.

However, the printer function is different from the copy function in that validation and print enabling must occur after the printer request. In requesting a print job on a personal computer, a "print" command is issued from a menu. The printer driver activates a dialog box that "pops up" to offer a selection of print options. The printer dialog can include an input field for entering a departmental code. After entry, an "OK" button is clicked in order to instruct the printer driver to send the print job with the desired selections to the printer controller. If a valid code is entered, the print function will be enabled and the print job will be charged to the department. However, if an invalid code is entered, the charge is directed to an undefined account and the print job will not print. The user may be unaware that an invalid code has been entered. Also, the user is not timely notified that service has been denied due to an invalid code. This can result in waiting at a printer for a print job that does not proceed, resulting in wasted time and user inconvenience. This problem can be especially exacerbated if the source file is closed or is otherwise unavailable for resubmission of the print request.

SUMMARY OF THE INVENTION

In view of the difficulties and drawbacks encountered in previous-type systems, there is therefore a need for a method of validating a code in the printer driver before a print job is submitted to the printer controller.

There is also a need for a method that gives timely notification to the user of an invalid entry.

There is also a need for a method that reduces user inconvenience and increases efficiency.

These need and others are satisfied by the method of printer accounting according to the present invention. In the present method, a print dialog is invoked to select printing options for a document. A department code is entered on the print dialog, and a print command is submitted while concurrently sending the department code for validation. A validation step is performed to determine whether the department code is valid. A print job is generated if the entered department code is valid. If the department code is invalid, the user is prompted to enter a valid department code.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

The present method is directed to a method of printer control and accounting that is performed at both the printer driver and also the printer controller. The present method is suitably implemented by a management utility based either on a network or locally on a personal computer or peripheral device, or as a utility incorporated into the print driver. The printer driver is configured to perform validation while the printer controller performs both validation and enforcement. Without valid entry of the department code, the print command will be rejected outright and not printed, with immediate notification to the user by way of a pop-up dialog box.

Figure 1:
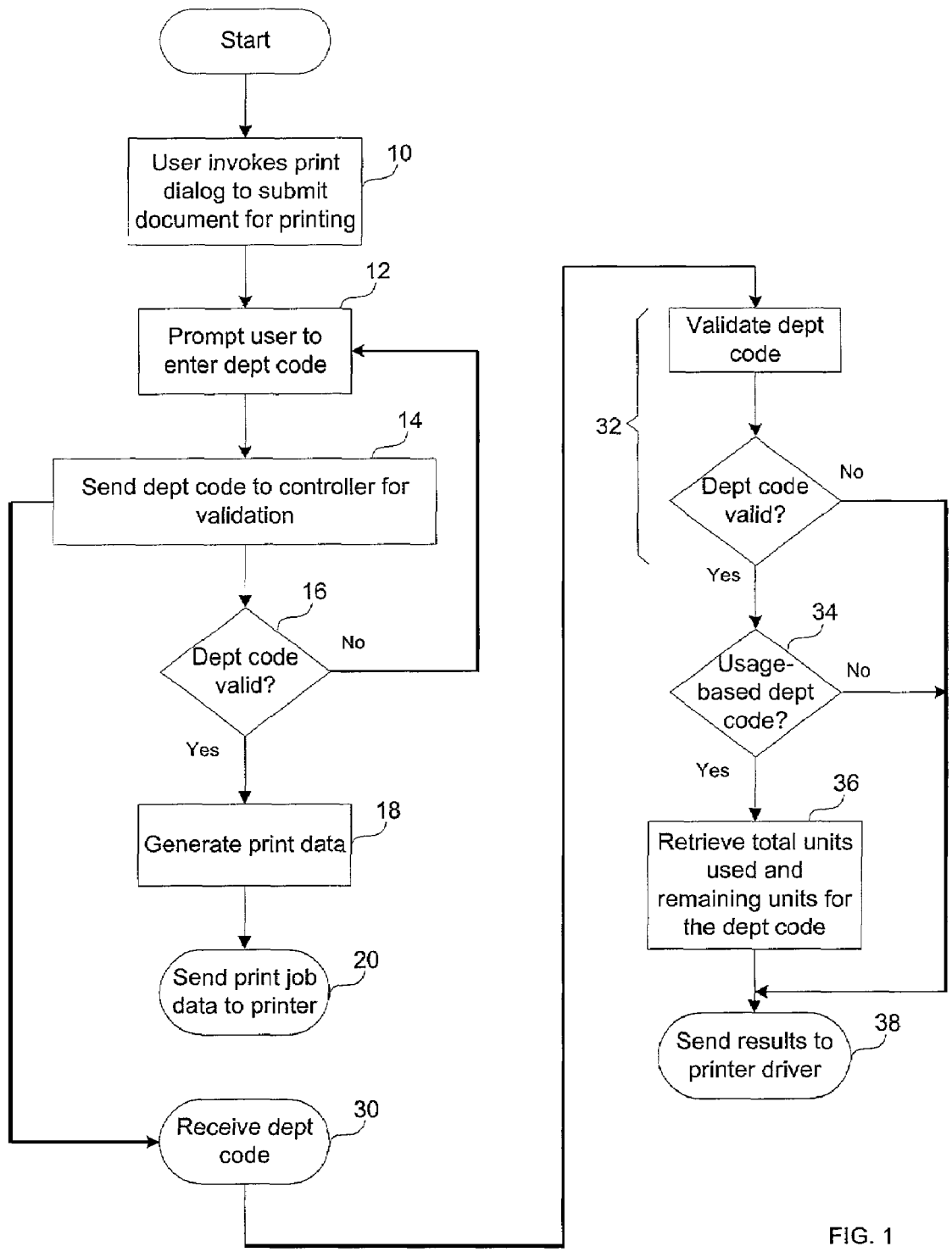
FIG. 1 is a flow chart generally depicting the steps of the method of the present invention.

The steps of the present method are shown in FIG. 1. A step of invoking a print dialog in performed at block 10 to submit a document for printing. In the preferred embodiment, this step includes selecting a "print" command from a menu of command options in a document application. This command causes a dialog box to pop up for selecting printing options for the document to be printed. A step of prompting the user is performed at block 12 to enter a department code, preferably into an input field on the print dialog. This prompt is suitably in the form of text on the printer dialog, or in a separate dialog that pops up after entry with an alert message, e.g. "invalid code, please re-enter," in the event that an invalid code or no code is entered in the field.

After entry of the code, the "OK" button is clicked in order to submit a print command to the printer controller and concurrently perform the step of sending the department code to the print controller for validation at block 14. A validation step is performed at block 16 at the print driver to determine whether the department code is valid. In the preferred embodiment, after clicking "OK," on the print dialog, the print driver actually goes out and queries the controller to determine whether the code is valid. A step follows of generating a print job follows at block 18 if the entered department code is valid, followed subsequently by a step of sending the print job to the printer at block 20. If the entered department code is not valid, the step of prompting the user at block 12 is repeated so as permit the entry of a valid department code. The print controller will receive the print job for processing, but if it detects that the department code is invalid or there is no department code, it will send the job to an invalid queue. The print job will sit in an "invalid" queue, and can be viewed as such by using a top access print job monitoring utility for viewing all the queues in the controller. Any pending print jobs in the invalid queue are suitably viewed and released by entering a valid department code.

In the preferred embodiment, at block 30 the print controller also performs a step of receiving the department code sent in block 14 and in block 32 performs its own step of validation, concurrently with the validation step performed at the printer driver in block 16. If the department code is not valid, the negative result is forwarded in block 38 to a step of sending results back to the printer driver, which triggers the step of prompting the user at block 12. In the steps of performing a validation at blocks 12, 32, the department code is compared to a set of codes maintained on a look-up table, wherein validation includes comprises obtaining a match between the department and one of the set of codes. Preferably, the look-up table is maintained on the printer controller inside the combined copier/printer unit, and is accessed by the controller and the printer driver. However, such a look-up table can also reside on one or more personal computers, or be maintained over a network. When the printer driver queries the controller in the validation step 16, the query is directed to this look-up table, at which the comparison is made.

If the department code is valid, a determining step at block 34 is optionally performed for determining whether the department code accesses a pre-paid account having a predetermined number of usage units. The usage units suitably measure available print copies where the validation code would expire after a predetermined number of copies. The usage units suitably also measures access time where the code expires after a predetermined time period. Any other measurement is used that is deemed convenient for tracking printer usage. In this embodiment, a negative result is sent to the printer driver to prompt the user at the step of block 12 to enter a valid code. After the determining step at block 34, a step of retrieving and displaying the usage units is performed at block 36. The retrieving and displaying step at block 36 is suitably used to display the total number of usage units remaining on the pre-paid account, or to display the total number of usage units accumulated from the pre-paid account. In a further aspect of the invention, the department code is suitably a limited-use code issued by a system administrator. The limited-use code is suitably either a single-print use code or a limited-time use code. Also, the system administrator suitably releases any jobs waiting for printing in an invalid queue. If any pending jobs are not released within a predetermined time period, the jobs are flushed from the queue. An audit process is suitably used by the system administrator to track the print jobs that get flushed.

Figure 2:
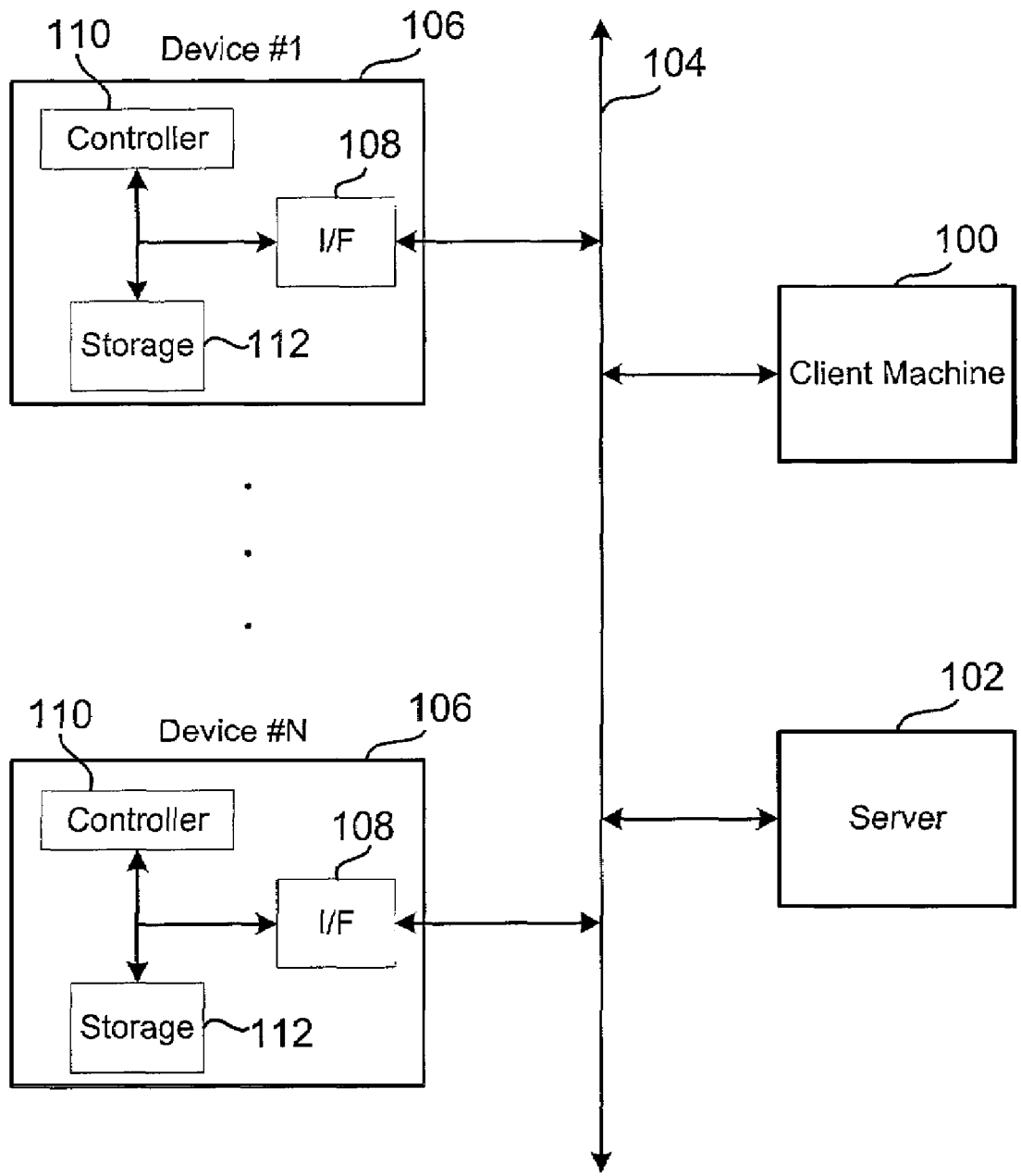
FIG. 2 is a block diagram generally indicating a network as deployed with the present invention.

An exemplary network employing the present invention is shown in FIG. 2. Any number of client machines 100 receive network software and messages from at least one server 102. All network devices are connected to the network using a network backbone 104. The network suitably includes any number N of network peripheral devices 106 including output devices, preferably devices 106 such as printers or combined printer/copier devices. Each device 106 includes a network interface 108, a controller 110 and a memory 112 for storage of software and various data, integral with the device, such as the look-up tables having department codes and the like.

The invention includes a safeguard to prevent a user from disabling the validation control. If the validation were turned off, the printer driver would have no bi-directional communication with the controller. With no bi-directional communication, no department code information is received from the controller. Any print command issued without bi-directional control would not validate and the command would time out, and inform the user of an error, e.g. "cannot locate the printer." In this way, print enforcement is handled by the controller. The present invention is advantageous in that an interaction occurs between the printer driver and the controller. Enforcement at both these places insures accurate and reliable accounting and control against circumvention.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

What is claimed is:

1. A method for document output accounting for use in accounting for document output in a document rendering system, comprising the steps of:

receiving, from an associated user, an output request to commence a document output operation for a selected electronic document by invocation of a print driver, which output request is received by a bi-directional output driver disposed on a workstation;

invoking the bi-directional output driver on the workstation upon receipt of an output request;

generating a prompt for accounting information associated with each of a plurality of received document output requests, receiving accounting information relating to each received document output request, receiving, via an associated network, account code information retrieved from an associated output controller, verifying local accounting information via testing the accounting information against received account code information, within the output driver, to determine acceptability thereof, selectively communicating, via an associated network, in accordance with an output of the testing step, the accounting information to the associated output controller for completion of a secondary, remote verification thereof, subsequent to testing of the accounting information via the output driver, receiving from the associated output controller, via the associated network, confirmation data representative of acceptance of the accounting information, generating a second prompt for accounting information associated with the received document output request in the event that the output of the testing step indicates unacceptable accounting information, preventing communication of the electronic document, via the associated network, to the output controller to facilitate an output thereof until such time as the confirmation data indicates acceptance of accounting information;

commencing transfer of the electronic document, via the associated network, to a storage associated with the output controller when the confirmation data indicates acceptance of the accounting information;

preventing commencement of the document processing operation upon a loss of bi-directional communication of accounting information between the output driver and the associated output controller prior to completion of the secondary, remote verification;

receiving cost data corresponding to a cost associated with the document output operation from the output controller; and displaying the cost data at the workstation.

2. The method for document output accounting of claim 1, wherein the document output request is received by the driver via a call from a software application running on the workstation.

3. The method for document output accounting of claim 1, wherein the confirmation data includes account status data, which account data includes at least one data item from the group consisting of: available document output operations, pre-paid document processing operations, cost associated with a requested document output request, historical data associated with document processing operations associated with the accounting information, and processing time associated with a requested document processing request.

4. The method for document output accounting of claim 1 wherein the accounting information is temporally limited, and wherein the confirmation data indicates unacceptable accounting information after expiration thereof.

5. The method for document output accounting of claim 1 wherein the accounting information is limited to pre-selected selected document output operations, and wherein the confirmation data indicates unacceptable accounting information when document processing operations other than the pre-selected document processing operations are selected.

6. A computer-readable medium of instructions with computer-readable instructions stored thereon for document output accounting for use in accounting for document output in a document rendering system, comprising:

instructions for receiving, from an associated user, an output request to commence a document output operation for a selected electronic document by invocation of a print driver, which output request is received by a bi-directional output driver disposed on a workstation; and instructions for invoking the bi-directional output driver on the workstation upon receipt of an output request;

the bi-directional output driver including upon being invoked:

instructions for generating a prompt for accounting information associated with each of a plurality of received document output requests, instructions for receiving accounting information relating to each received document output request, instructions for receiving, via an associated network, account code information retrieved from an associated output controller, instructions for verifying local accounting information via testing the accounting information against received account code information, within the output driver, to determine acceptability thereof, instructions for selectively communicating, via an associated network, in accordance with an output of the testing, the accounting information to the associated output controller for completion of a secondary, remote verification thereof, subsequent to testing of the accounting information via the output driver, instructions for receiving from the associated output controller, via the associated network, confirmation data representative of acceptance of the accounting information, instructions for generating a second prompt for accounting information associated with the received document output request in the event that the output of the testing indicates unacceptable accounting information, instructions for preventing communicating the electronic document, via the associated network, to the output controller to facilitate an output thereof until such time as the confirmation data indicates acceptance of accounting information;

instructions for commencing transfer of the electronic document, via the associated network, to a storage associated with the output controller when the confirmation data indicates acceptance of the accounting information;

instructions for prevention commencement of the document processing operation upon a loss of bi-directional communication of accounting information between the output driver and the associated output controller prior to completion of the secondary, remote verification;

instructions for receiving cost data corresponding to a cost associated with the document output operation from the output controller; and instructions for displaying the cost data at the workstation.

7. The computer-readable medium of instructions with computer-readable instructions stored thereon for document output accounting of claim 6, wherein the document output request is received by the driver via a call from a software application running on the workstation.

8. The computer-readable medium of instructions with computer-readable instructions stored thereon for document output accounting of claim 6, wherein the confirmation data includes account status data, which account data includes at least one data item from the group consisting of: available document output operations, pre-paid document processing operations, cost associated with a requested document output request, historical data associated with document processing operations associated with the accounting information, and processing time associated with a requested document processing request.

9. The computer-readable medium of instructions with computer-readable instructions stored thereon for document output accounting of claim 6 wherein the accounting information is temporally limited, and wherein the confirmation data indicates unacceptable accounting information after expiration thereof.

10. The computer-readable medium of instructions with computer-readable instructions stored thereon for document output accounting of claim 6 wherein the accounting information is limited to pre-selected selected document output operations, and wherein the confirmation data indicates unacceptable accounting information when document processing operations other than the pre-selected document processing operations are selected.

* * * * *